United States Patent
Blankenship et al.

(10) Patent No.: US 8,766,132 B2
(45) Date of Patent: Jul. 1, 2014

(54) SYNERGISTIC WELDING AND ELECTRODE SELECTION AND IDENTIFICATION METHOD

(75) Inventors: George Blankenship, Chardon, OH (US); Rob Micco, Highland Heights, OH (US); Arthur B Papineau, Strongsville, OH (US)

(73) Assignee: Lincoln Global, Inc., City of Industry, CA (US)

( * ) Notice: Subject to any disclaimer, the term of this patent is extended or adjusted under 35 U.S.C. 154(b) by 1394 days.

(21) Appl. No.: 12/497,974

(22) Filed: Jul. 6, 2009

(65) Prior Publication Data

US 2011/0000893 A1 Jan. 6, 2011

(51) Int. Cl.
*B23K 11/04* (2006.01)
*B65D 85/02* (2006.01)
*B23K 13/08* (2006.01)

(52) U.S. Cl.
USPC ... 219/108; 219/119; 219/130.1; 219/137 PS; 219/137 R; 219/121.11; 242/588.2; 242/129.8; 242/588.6; 242/598.6; 242/570; 228/8; 228/41; 228/56.5; 228/102; 228/244

(58) Field of Classification Search
CPC .............................. B23K 11/24; B23K 11/30
USPC .............. 219/108, 119, 54–56.1, 60 R, 61.6, 219/69.15, 76.1, 76.14, 76.17, 85.16, 85.18, 219/85.2, 121.11, 121.52–121.54, 121.73, 219/136, 137 PS, 137 WM, 137.2, 130, 219/137 R; 242/588.2, 129.8, 588.6, 598.6, 242/570; 228/8, 41, 56.5, 102, 244; 235/375, 449, 494, 462.13; 206/389, 206/400, 415, 453, 586, 597
See application file for complete search history.

(56) References Cited

U.S. PATENT DOCUMENTS

| | | | |
|---|---|---|---|
| 3,249,319 A * | 5/1966 | Wasson | 242/588.1 |
| 4,973,814 A * | 11/1990 | Kojima et al. | 219/110 |
| 5,500,512 A | 3/1996 | Goldblatt | |
| 5,692,700 A | 12/1997 | Bobeczko | |
| 2003/0126735 A1* | 7/2003 | Taniguchi et al. | 29/593 |
| 2004/0004113 A1* | 1/2004 | Blankenship | 235/375 |
| 2005/0109738 A1* | 5/2005 | Hewett et al. | 219/121.48 |
| 2006/0157461 A1* | 7/2006 | Diekmann et al. | 219/137.71 |
| 2006/0207981 A1* | 9/2006 | Diekmann et al. | 219/137.2 |
| 2008/0149607 A1* | 6/2008 | Albrecht | 219/130.1 |
| 2009/0166345 A1* | 7/2009 | Enyedy et al. | 219/137.2 |
| 2010/0012635 A1* | 1/2010 | Wierschke et al. | 219/130.1 |

FOREIGN PATENT DOCUMENTS

| | | |
|---|---|---|
| EP | 1065 620 | 1/2001 |
| WO | WO 2011/004238 | 1/2011 |

OTHER PUBLICATIONS

International Search Report dated Aug. 10, 2010 in related international Patent Application No. PCT/IB2010/001653.

* cited by examiner

*Primary Examiner* — Dana Ross
*Assistant Examiner* — Ket D Dang
(74) *Attorney, Agent, or Firm* — Perkins Coie LLP (57) ABSTRACT

A method of identifying and selecting welding electrodes and welding output parameters on a welding power source is provided. The method includes identifying electrodes and/or electrode packaging with distinct colors and/or patterns which correspond to properties of the electrode. The method also may include employing distinguishable identifying markings on a power supply which correspond to the electrodes to be used to allow for easy setting of output parameters.

27 Claims, 4 Drawing Sheets

SYNERGISTIC WELDING AND ELECTRODE SELECTION AND IDENTIFICATION METHOD

BACKGROUND OF THE INVENTION

1. Field of the Invention

Devices, systems, and methods consistent with the invention relate to a method and apparatus of selecting welding parameters and electrodes.

2. Description of the Related Art

Welding requires the use of welding electrodes. Because of the wide variations and differences in each welding application, welding electrodes have widely varying characteristics. For example, welding electrodes have varying diameters and chemical compositions. Additionally, some electrodes are self-shielding (e.g., FCAW), while others are solid metal electrodes. With these widely varying characteristics, the use of the proper electrode for a particular welding operation is important to ensuring that a satisfactory weld is achieved. However, because some of these differences, such as chemical composition, are not easily discernable by the naked eye or even upon close examination it can be difficult for a welder to properly distinguish between welding electrodes.

In an effort to properly identify welding electrodes, very often the electrode packaging contains the needed identification information. Welding electrodes are stored by various means. For example, welding electrodes are often found on spools of varying lengths (e.g., MIG welding), bundles of individual electrodes (e.g., stick and TIG welding) and large containers (e.g., robotic welding, etc.). However, identification of the properties and characteristics of the electrode merely from the packaging can also be difficult. For example, if a package is placarded with the information regarding an electrode, it is typically done so in a standard font or type which is not easily readable from afar. Additionally, the identification information packaging (such as spools or boxes) can be compromised or otherwise rendered illegible because of the environments in which welding takes place. Thus, even when the electrode packaging contains electrode information, easy identification of the electrode can be difficult. Additionally, once an electrode is removed from its packaging it can be very difficult to determine the properties of the electrode.

As is also known, to perform a proper welding operation it is necessary to set the welding power supply at the proper operational welding settings. These welding settings can include, but are not limited to: wire feed speed, voltage, and amperage. Many factors of the welding operation to be performed affect the settings to be used. For example, the size and type of the electrode, the type of the material to be welded and the thickness of the material to be welded may affect the settings that are to be used for the welding operation. Thus, it is often important for these settings to be properly adjusted prior to the welding operation beginning. These adjustments often require the welder (i.e., operator) to manually adjust controls on the power supply to obtain the proper settings.

Because of the nature of these controls and the potential for misidentifying the characteristics of the electrode, there is a possibility that a welder would input the wrong settings, resulting in an improper weld. Additionally, because of the limitations on current electrode packaging, as discussed above, it is difficult to easily inventory or otherwise identify welding electrodes.

Accordingly, an improved welding electrode selection and identification method is needed.

BRIEF SUMMARY OF THE INVENTION

An exemplary embodiment of the present invention is a welding electrode carrying device which contains a first identifier portion having a first shape and a first color and a second identifier portion having a second shape and a second color. At least one of the first shape and the first color identifies at least a first characteristic of the welding electrode and at least one of the second shape and the second color identifies at least a second characteristic of the welding electrode.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

Figure 1A:
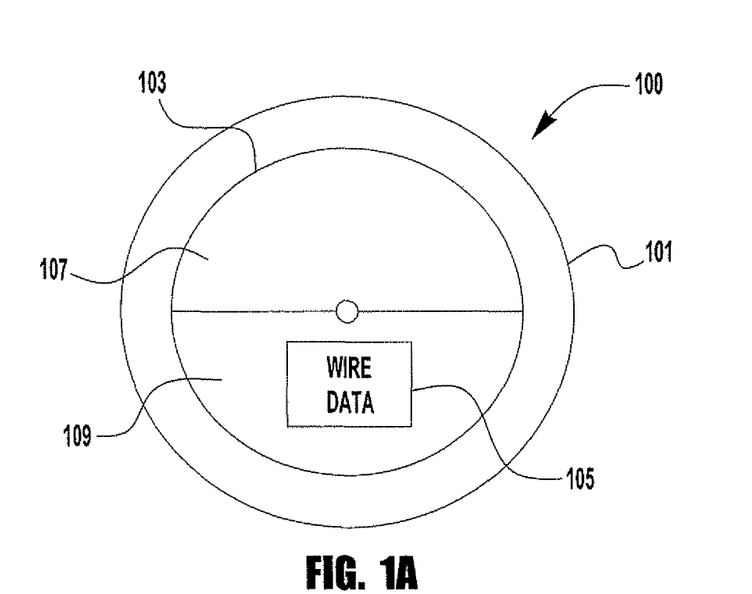
FIGS. 1A to 1C illustrate diagrammatical representations of an electrode spool in accordance with exemplary embodiments of the present invention.
Figure 1B:
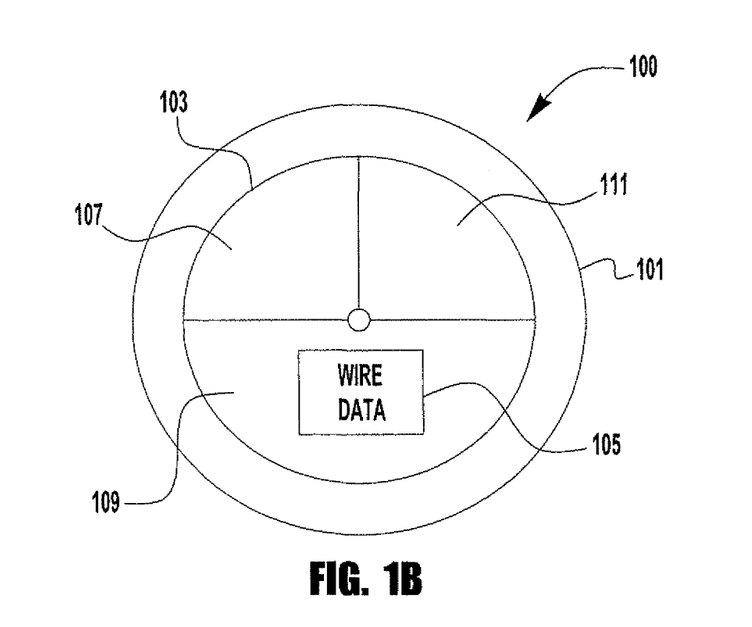
Figure 1C:
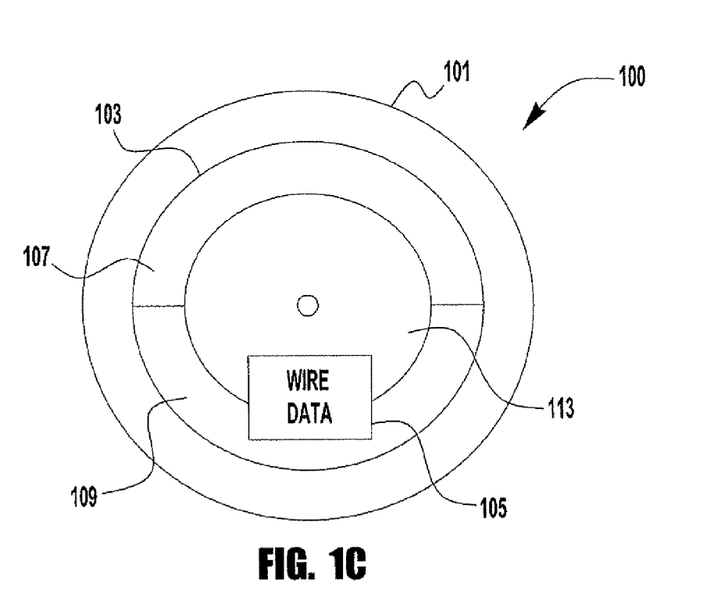

FIGS. 1A through 1C diagrammatically illustrate a spool 100 in accordance with various exemplary embodiments of the present invention. A welding electrode (not shown) is wound on the spool 100 so that as the electrode is consumed it can be drawn from the spool. For example, in a semi-automatic MIG welding process often a wire feeding device (not shown) is employed, where the spool 100 is mounted onto the wire feeding device. Thus, the electrode can be continuously fed to the weld as needed during the welding operation. The spool 100 is of any known construction, size, etc. In fact, any known or used spools 100 can be used. The present invention is not limited in this regard.

It is also noted that the present invention is not expressly limited to the use of a "spool" as a carrying device or means of storage. It is recognized that in the majority of welding applications welding electrodes are wound on spools to allow for continuous payout of the electrode during a welding electrode. However, electrodes can also be stored/transported in large bulk containers, boxes (for example stick electrodes) and various other means of transport. Therefore, although a spool is discussed below and depicted in the exemplary figures, the electrode carrying device of the present invention is not limited to a spool, or other specific means discussed herein.

The spool 100 has at least one face 101 upon which information regarding the electrode is placed. Further, the face 101 provides containment for the electrode on the spool. In the exemplary embodiments shown, at least one electrode identifier 103 is placed on the face 101 of the spool 100.

The electrode identifier 103 contains visual information which quickly relays the relevant information regarding the electrode contained on the spool 100. For example, as shown in FIG. 1A the identifier 103 contains two identification portions 107 and 109. In this exemplary embodiment, the portion 107 is used to identify a first property of the electrode, while the portion 109 identifies a second property of the electrode. Each of the portions 107 and 109 are colored and/or patterned, and each of the portions 107 and 109 are colored/patterned differently.

For example, in an exemplary embodiment of the present invention the portion 107 is used to identify the diameter of the electrode and the other portion 109 is used to identify the type of the electrode, such as material, composition, self-shielding, etc. The present invention is not limited in this regard, as the portion 107 can be used to identify any parameter of the electrode as needed from an operational standpoint or as required by an end user. In fact, it is contemplated that the present invention will allow individual users to create a custom identification methodology.

In the exemplary embodiments shown, the faces 101 also contain wire data information placard 105. This wire data information placard 105 can be in any form and relay any relevant information to the user regarding the electrode on the spool 100. This information can be displayed by any known or conventional means. It can be placed on the face 101 via a decal, embossing, painting, etc., and can also include a bar code. Additionally, the information placard 105 can also be placed at any position on the face 101. As shown in FIGS. 1A through 1C the information placard 105 is positioned on one "side" of the face 101. This is done to allow someone distinguish the portions 107 and 109, or top and bottom of the spool 100. This will be explained more fully below.

In a further exemplary embodiments, other technologies can be used as a replacement, or in conjunction with the information placard 105, including bar code technology and/or RFID (radio frequency identification). In exemplary embodiments, RFID technology can be used to allow for automated and/or automatic product updates, consumption data and tracking and simplified replacement ordering. For example, consumption of the electrode can be monitored and reported.

Turning back to portion 107 and 109, these portions are used to identify various electrode properties. To be consistent with the discussion above, portion 107 identifies the electrode diameter, while portion 109 identifies the type of electrode. (This is only intended to be exemplary for purposes of the discussion herein). Each of these portions is identified by a separate color, or other indicating indicia, such as a pattern, etc. In an embodiment, the color or pattern used will identify the same property on multiple spools 100.

For example, in an exemplary embodiment, the color blue can be used in the portion 107 to identify an electrode having a diameter of 3/16". Then for a particular consumer, or for a particular distributor or manufacture, the color blue in the portion 107 will always indicate that the electrode has a diameter of 3/16". Therefore, any welder looking to easily identify a spool having 3/16" diameter electrode will be able to quickly identify the electrode without having to read a label or otherwise closely analyzing the electrode itself.

In the embodiment shown, the portion 109 identifies another property of the electrode, such as its type. For example, the portion identifies the electrode as being stainless steel, or copper coated, etc. This portion would use another color or pattern, such as yellow.

Accordingly, when a user sees the spool 100 with a blue and yellow identifier 103, the user can immediately know that the electrode is a stainless steel electrode having a diameter of 3/16". This can be determined from far away.

Additionally, as shown in this embodiment and discussed above, the wire data information placard 105 is shown in the portion 109 so that the user can distinguish one portion from the other. If the positioning of the information placard 105 is consistent on the face 101 then a user can easily distinguish portion 107 from 109. Thus, a user would know that the portion 107 without the information placard 105 is always the electrode diameter.

Of course, other methods of distinguishing between the portions 107 and 109 can be employed. For example, a marker (not shown) can be used on or near the identifier 103 which indicates which portion identifies the diameter. Optionally, the portion 107 can be larger than the portion 109, so that it is known that the larger area always identifies the diameter, while the smaller portion identifies the other parameter, such as type. Thus, in an embodiment the area of one portion is larger than another portion.

In an exemplary embodiment, the area of the portions 107 and 109 comprise 100% of the area of the identifier 103. However, alternative embodiments are contemplated where the portions 107 and 109 make up less than the full area of the identifier 103, but they should be large enough to allow for ease of identification of the desired wire parameters.

In a further exemplary embodiment, the identifier 103 can be of a single color or pattern, if only one parameter is desired to be identified, such as diameter. If a user only uses a single type of electrode, such as stainless steel, they do not need identification of the type and thus only need identification of the diameter. Alternatively, it is also contemplated that the spool 100 has a color to signify a parameter of the electrode, such as diameter, so that the solid color/pattern of identifier 103 can signify another parameter. For example, a spool 100 having a red color will designate an electrode with a diameter of 1/8" and a black color on the identifier will identify a copper coated steel electrode.

Additionally, in another exemplary embodiment, the identifier 103 can have a primary color, designating the diameter for example, with a series of differently colored sections or patterns within it, which would designate another parameter. For example, if the primary color of the identifier 103 is green the diameter of the electrode is 3/16" and if there is a series of white diagonal lines the electrode is a self-shielding electrode. In another exemplary embodiment, the identifier 103 can have an overall shape, such as a circle, square, triangle, etc. and then one of the regions 107/109 can be positioned within the perimeter of the identifier 103, such that the identifier 103 visually represents a background to the portion(s) 107/109. In such an embodiment, the portion(s) 107/109 may have a similar shape to the identifier 103, but a different color, or may have a different shape. Thus, it is contemplated that the shape and/or color of the identifier 103 signifies a first and/or second parameter of the wire, while the shape and/or color of the portion(s) 107/109 within the identifier 103 signify a third and/or fourth parameter of the wire.

For example, it is contemplated that the identifier 103 can have a circular shape—which signifies a first wire characteristic and be colored orange—which signifies a second wire characteristic. Additionally, a portion 107 is positioned within the perimeter of the identifier 103 (such that the identifier 103 represents a background to the portion 107), where the portion 107 has a square shape—representing a third wire characteristic and is colored black—which identifies a fourth wire characteristic. Thus, it is apparent that embodiments of the present invention represent significant flexibility in the easy identification of welding electrodes and their characteristics.

It is contemplated that those of ordinary skill in the art, coupled with the knowledge disclosed herein, are capable of using different exemplary combinations of the above discussions and incorporating them without departing from the spirit and scope of the present invention.

FIG. 1B depicts a further embodiment of a spool 100 in accordance with the present invention, in this embodiment, a third portion 111 is used to signify an additional parameter of the electrode. For example, the portion 111 can designate the length of electrode on the spool 100, or any other desired parameter. Thus, for example, if the portion 109 is blue the wire has a diameter of 3/16", if the portion 107 is purple the electrode is stainless steel and if the portion 111 is white the original length of electrode on the spool 100 is 500'. Of course, the portion 111 is not limited to be as depicted in this figure and can be designated or designed in any way to make it visible to the user.

In a further embodiment, the portion 111 can simply be transparent or can be omitted altogether from the face 101 of the spool 100. In this embodiment, a user can visually inspect the amount of electrode remaining on the spool 100 through the face 101 of the spool 100. This can allow the user to quickly understand the amount of electrode remaining on the spool 100. The present invention is not limited in this regard.

FIG. 1C depicts a further exemplary embodiment of the present invention in which a third portion 113 is employed. In this embodiment, the portion 113 is positioned centrally in the identifier 103. This portion can be used to indicate that the electrode is a flux-cored (self-shielding) electrode, and can be of a color to identify a specific property regarding the flux. Further, portions 107 and 109 can identify other parameters such as diameter and type, as needed.

In an additional embodiment of the present invention, the characteristics (i.e., color and shape) of the data information placard 105 can provide a visual identification of desired electrode characteristics. In an embodiment of the present invention, it is contemplated that the shape of the data information placard 105 (such as a decal) can relay the diameter of the electrode while the color of the field of the data information placard 105 can relay the type of electrode (material type). For example, in an embodiment, a triangular shaped placard 105 can mean that the electrode has a diameter of 0.035" while a circular placard 105 can mean a diameter of 0.045" and a rectangular placard 105 (as shown) denotes a diameter of 0.072". With a consistent placarding strategy a user can easily using such information to identify electrodes for welding and inventory purposes. Further, the coloration of the background and/or the text of the placard 105 can provide additional electrode characteristic information, such as electrode type. For example, a purple background on the placard 105 can mean a flux-cored electrode, etc. This will allow a user and/or manufacturer to develop a standard system for easy identification greatly simplifying the welding process. In additional embodiments, it is contemplated that various other patterns, borders, etc. on or near the placard 105 can be used as means to identify characteristics of a welding electrode. Of course, the examples stated above are not intended to be limiting in any way, but are provided to disclose exemplary embodiments which can be used and are contemplated. Further, the present invention is not limited to using the identification placards on spools, but can be used on any packaging means, including bulk packaging.

Figure 2A:
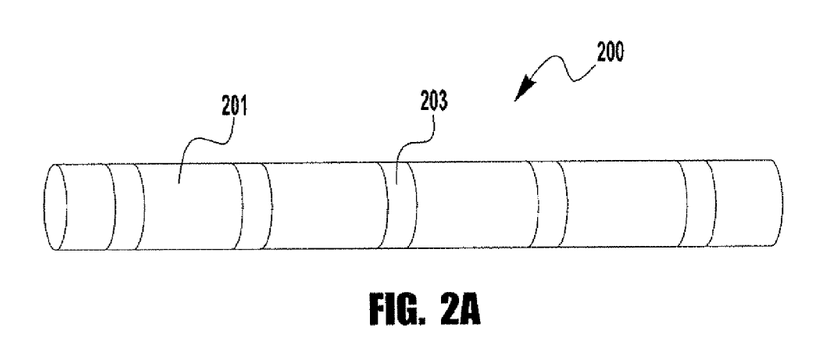
FIGS. 2A and 2B illustrate diagrammatical representations of an electrode in accordance with exemplary embodiments of the present invention.

Turning now to FIG. 2A, an electrode 200 in accordance with an exemplary embodiment of the present invention is shown. In this embodiment, an outer surface of the electrode contains a first portion 201 and a second portion 203, which are used similar to the portions 107 and 109, discussed above. For example, the portion 201 can be colored to designate the diameter of the electrode 200, whereas the portion 203 is colored to identify the type of electrode 200. In this embodiment, the relevant parameters of an electrode 200 can be quickly determined simply by looking at the electrode 200.

In another embodiment, the portions 201 are not colored in anyway, but are merely the natural color and surface of the electrode 200. Thus, if only one parameter needs to be identified on the electrode 200 the portions 203 can be utilized. It is noted that the portions 203 are shown as bands around the electrode 200. The present invention is not limited in this regard as the portions 203 can take any shape, spacing or orientation as needed to visually identify a parameter of the electrode.

Figure 2B:
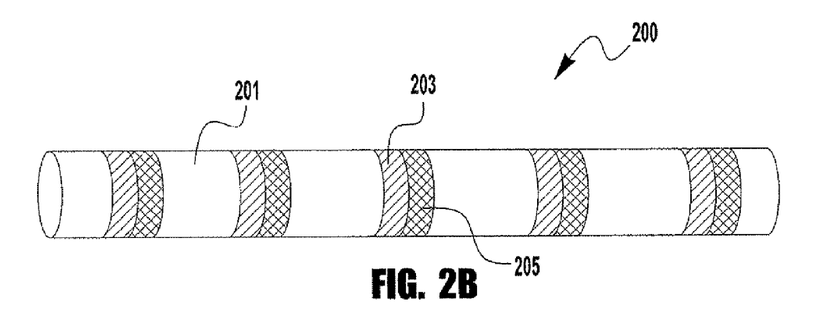

FIG. 2B depicts another embodiment of an electrode 200 in accordance with the present invention. In this embodiment, another portion 205 is added to the electrode 200 which has a different color or pattern than portions 201 and 203. As with FIGS. 1B and 1C, this additional portion 205 is used to identify another property of the electrode 200. The portions 201, 203 and 205 can be of any shape, color, or pattern to allow for easy identification of the properties of the electrode 200.

Figure 3:
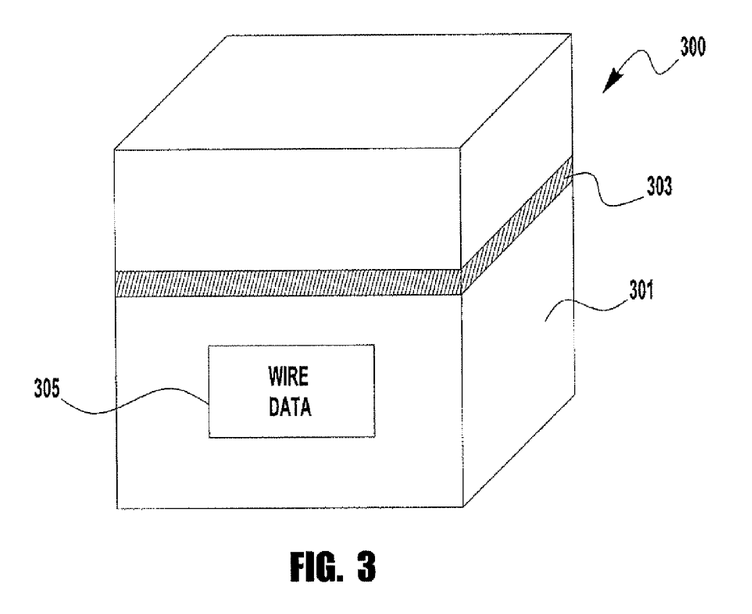
FIG. 3 illustrates a diagrammatical representation of an electrode package in accordance with an embodiment of the present invention.

FIG. 3 depicts a diagrammatical representation of an electrode package 300 in accordance with an embodiment of the present invention. For example, the package 300 can be a large container for a large electrode bundle (not shown) which are often used in robotic welding. In this embodiment, the package 300 has a first portion 301 which has a first color or pattern to signify a property of the electrode, and optionally a second portion 303 having a different color or pattern to identify a second property of the electrode 300. Wire data information 305 can also be positioned on the package 300. In such an embodiment, the coloring and/or patterning of the regions 301 and 303 clearly indicate the appropriate properties of the electrode within the package. This allows users to clearly identify, even from afar, the electrode being used. This improves efficiency, weld quality (by aiding in ensuring the proper electrode is being used), and inventory management.

Of course, additional regions can be employed on the packaging 300 to signify additional electrode properties. Further, the size, shape, pattern and/or coloring of the regions 301 and 303 (and more if used) can vary as desired to provide the desired information regarding the electrode.

Figure 4:
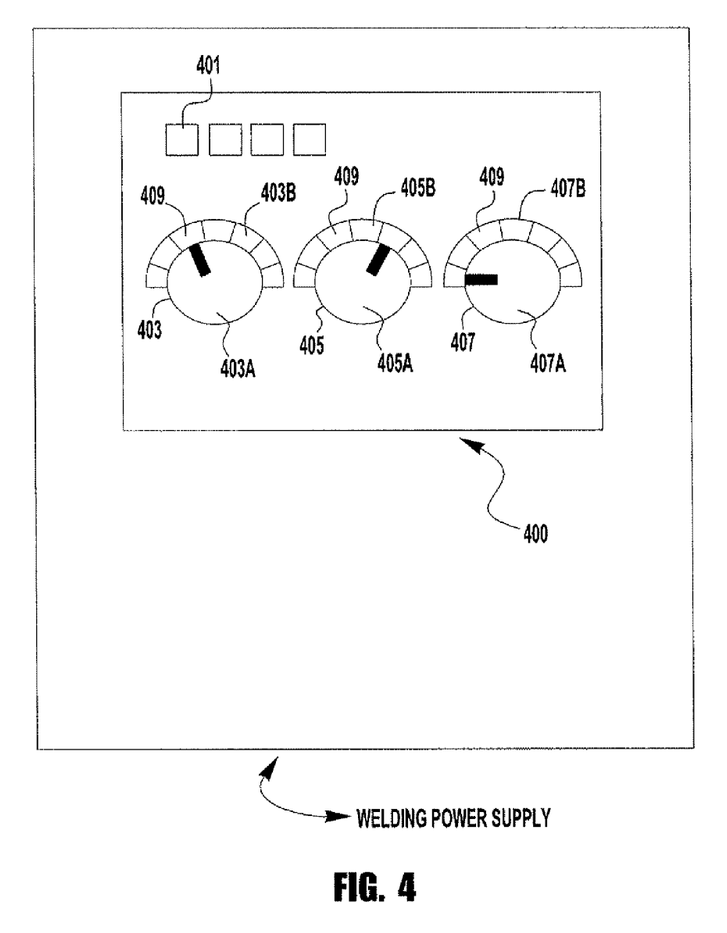
FIG. 4 illustrates a diagrammatical representation of a welding power source control panel in accordance with an exemplary embodiment of the present invention.

Turning now to FIG. 4, a control panel 400 of a welding power supply (not shown) in accordance with an embodiment of the present invention is shown. It is initially noted that this figure merely depicts a representation of a control panel 400 of a power supply, and is not intended to be limiting in any way regarding the look and/or configuration of the power supply, or any component thereof. Because welding power supplies of various configurations, their control and operation are so well known to those skilled in the art, no detailed discussion thereof will be set forth herein. However, it is contemplated that embodiments of the present invention can be employed on all types of welding power supplies and welding systems.

Turning now to a description of a welding system incorporating exemplary embodiments of the present invention, the control panel 400 of the welding power supply contains a number of controls or switches 401 which are used to perform various functions, such as turning on the power supply, etc. Additionally, the control panel 400 contains a number of output controls 403, 405 and 407. The use and configuration of various output controls on a welding power supply is widely known by those of skill in the art and will not be discussed herein. The controls depicted in FIG. 4 are of a dial type. Of course, other known types can be employed. It is also noted that the design, operation and construction of welding power supplies with complex control and processing capability are well known to those skilled in the art. Accordingly, a detailed discussion regarding welding power supplies will not be discussed herein. It is also noted that for purposes of the figure all of the controls are depicted on the control panel 400. However, the present invention is not limited in this regard as the controls can be located at any location on the power supply to facilitate user operation.

In the shown embodiment, each of the output controls 403, 405 and 407 are comprised of a control portion 403A, 405A and 407A, respectively, and a setting portion 403B, 405B and 407B. The control portions "A" are employed by the user to adjust the various output settings of the power supply. These settings are known by those of skill in the art, and can include (but not limited to): welding voltage, welding amperage, wire feed speed, etc.

The setting portions "B" are displayed on the control panel 400 adjacent to the control portions "A" so that the setting portions "B" can be employed to allow the user to properly set or adjust the control portions "A". In an embodiment of the present invention, each of the setting portions "B" is comprised of individual regions 409 which correspond to different control settings. In an embodiment of the present invention, each of the regions 409 are identified or distinguished by different colors or patterns which signify a different setting. Each of the colors or patterns used for the regions 409 are selected based on a user's preferences, to signify distinct settings for that output control 403, 405 and 407.

For example, if output control 403 controlled the output voltage of the power supply 400, than each distinct region 409 would signify a different voltage setting and be identified by a different color or pattern which clearly distinguishes the respective settings from each other. This renders the overall control of the power supply and use of the control panel 400 easier.

The present invention also contemplates employing a synergistic relationship between electrode identification (as discussed above regarding FIGS. 1A through 3) and the colors or patterns used in the regions 409 on the power supply 400. Specifically, the present invention contemplates coordinating the coloring/patterning used to identify the electrodes (discussed above) and in the regions 409 to allow a user to quickly and properly select the appropriate output settings for a specific electrode and/or weld to be performed.

Accordingly, a particular user may wish to use specific control settings for the power supply based on the electrode being employed. In such an embodiment, the regions 409 can be identified with the same colors/patterning used to identify the electrodes such that a user can quickly set the output controls by merely looking at the identification (e.g., colors) of the electrode and making the appropriate settings on the machine. This is also beneficial because it is known that electrodes having slightly different parameters (such as diameter) can be used to accomplish the same type of weld. However, because at least one aspect of the electrode (e.g., diameter) is different at least some of the power supply settings must change. If a user is unfamiliar with a specific electrode type, by employing a color/pattern (or other visual identification) scheme, the user can simply select the appropriate settings by using the schemes employed. This renders welding with unfamiliar electrodes, materials, etc. easier and more efficient.

For example, if a user always uses a certain voltage, amperage, arc control and/or wire feed speed for a particular electrode, the regions 409 can be colored/patterned such that the regions 409 corresponding to the appropriate settings are colored to match the electrode identification. If the electrode is identified with blue (for diameter) and yellow (for type), the corresponding regions 409 can be identified with a combination of blue/yellow or either one of them, depending on what is desired by the user. Therefore, the user will not be required to remember all of the appropriate settings or turn to a look-up table, which can be inefficient. If the user identifies the electrode as a blue/yellow electrode, the user then simply adjusts the controls to the corresponding blue/yellow regions 409 and the power supply is properly set.

Additionally, if a user is familiar with using only a blue/yellow electrode but none are available and only a green/yellow electrode is available, the present invention simplifies the welding process by allowing the user to simply adjust the settings to the green/yellow regions. Thus, it will not be necessary for the user to delay the welding process by taking time to look up the needed welding settings for the new electrode type.

The regions 409 can be placarded on the control panel 400 by any known means. For example, the regions 409 can be painted, etched or decals.

In a further exemplary embodiment, the regions 409 can be LCD type displays (or any changeable visual display devices) which are capable of changing the displayed color and/or patterns based on various input settings. The use and control of LCD type displays (or similar types of displays) is well known and will not be discussed herein. In this embodiment, the color and/or patterns displayed in the regions 409 will be controlled based on input via the switches 401, or other input controls (not shown), such that when a user selects various parameters via the switches 401 a controller or CPU (not shown) will change the colors/patterns in the regions 409 to provide an appropriate visual guide, as described above. This embodiment greatly expands the possibilities and combinations which can be used.

In an embodiment of the present invention, the colors/patterns in the regions 409 are determined based upon information stored in a look-up table, within a computer, CPU, memory device, or the like, based on preprogrammed data.

In an example of the above embodiment, a user uses a switch 401 to enter the type of welding operation that will be performed, such as pulse welding, etc. and/or the user uses a switch 401 to enter the type of material of the weld, such as steel, stainless steel, etc. Based on these inputs the colors and/or patterns of the regions 409 are displayed to correspond to these inputs. For example, the colors of the regions 409 change to reflect the colors and/or color schemes associated with electrodes and/or electrode packaging used for the selected welding method. When a different welding method, material, or other parameter is selected via the switches 401 or other inputs, the colors/patterns of the regions 409 change again so that the appropriate color scheme is displayed. This again allows the user to easily associate a specific electrode with a welding method as well as select the appropriate output settings based on the electrode used.

In an additional exemplary embodiment, the regions 409 associated with some of the output controls 403, 405, or 407 change based on settings of other of the output controls. For example, if a user adjusts the output control 403 to a specific setting, the regions 409 of the control 405 are updated to new colors or patterns associated with the setting of the control 403. Thus, again making it easier for a user to select the appropriate settings.

For example, in an embodiment the control 403 is used to input the thickness of the materials to be welded and based on this input, and perhaps other inputs from the switches 401, the regions 409 associated with controls 405 and 407 are changed to show the appropriate color schemes to match the electrodes which would be used and the desired output settings. As an example, control 405 may be used to control the welding voltage or current and the control 407 may be used to control wire feed speed, and if an electrode is selected that has a red/black color scheme, the user would position the control portion 405A to the region 409 which is red, and the control portion 407A to the region 409 which is black. This will ensure that the correct output parameters are used for the weld data that has been input.

Thus, various embodiments and aspects of the present invention, as described above, can be employed to provide a synergistic welding system in which welding electrodes and/or electrode carrying devices (spools, boxes, etc.) can be identified with various visual indicia that matches visual indicia used on a control panel of a welding power supply to make setting and operating the welding power supply easier.

It is of course noted that the above discussions are intended to be exemplary in nature, and that the parameters and weld characteristics employed or used are a function of the user requirements. For example, parameters which can be used in the described synergistic method include (but are not limited to): material to be welded, electrode diameter, electrode type, type of welding process; and/or thickness of the material to be welded. The present invention is not limited by the parameters and the identification schemes to be used to ensure proper electrode identification and selection of the appropriate control parameters in the welding power source 400.

By employing various embodiments of the present invention, the efficiency of welding and inventory management can be increased, as well as increasing the quality of welding by avoiding errors in setting appropriate welding output parameters.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A welding electrode carrying device, said device comprising:
a first identifier portion having a first shape and a first color, said first identifier portion disposed on said welding electrode carrying device; and
a second identifier portion having a second shape and a second color, said second identifier portion disposed on said welding electrode carrying device,
wherein at least one of said first shape and said first color on said welding electrode carrying device identifies at least a first characteristic of a welding electrode in said welding electrode carrying device and wherein at least one of said second shape and said second color on said welding electrode carrying device identifies at least a second characteristic of said welding electrode in said welding electrode carrying device, and
wherein said first shape and said second shape are different from each other.

2. The welding electrode carrying device of claim 1, wherein said carrying device is a spool.

3. The welding electrode carrying device of claim 1, wherein each of said first and second identifier portions are part of a primary identifier portion having a third shape and third color, and wherein at least one of said third shape and third color identify a third characteristic of said electrode.

4. The welding electrode carrying device of claim 3, wherein said third shape is different from each of said first and second shape.

5. The welding electrode carrying device of claim 1, wherein said first identifier portion is larger than said second identifier portion.

6. The welding electrode carrying device of claim 1, wherein said first and second identifier portions collectively identify at least four distinct characteristics of said electrode.

7. The welding electrode carrying device of claim 1, wherein said first characteristic identifies a physical dimension of said welding electrode, and
wherein said second characteristic identifies a type of electrode.

8. The welding electrode carrying device of claim 7, wherein said physical dimension is at least one of a diameter and length, and
wherein said type of electrode identifies a material composition of said welding electrode.

9. A welding power supply, said power supply comprising:
a control panel comprising a first output control to control a first output of said welding power supply, and
a second output control to control a second output of said welding power supply,
wherein said first output control comprises a first control portion which is positionable to control said first output and a first setting portion positioned adjacent to said first control portion,
wherein said first setting portion comprises a plurality of first regions which identify different settings to control said first output, and each of said first regions contains at least one of a different color and pattern,
wherein said second output control comprises a second control portion which is positionable to control said second output of said welding power supply and a second setting portion positioned adjacent to said second control portion, and
wherein said second setting portion comprises a second plurality of regions which identify different settings to control said second output, and each of said second regions contains at least one of a different color and pattern.

10. The welding power supply of claim 9, wherein said color or said pattern in each of said first regions corresponds to a parameter of a welding electrode.

11. The welding power supply of claim 10, wherein said parameter of said welding electrode identifies at least one a physical dimension and a type electrode.

12. The welding power supply of claim 11, wherein said physical dimension is at least one of a diameter and length, and
wherein said type of electrode identifies a material composition of said welding electrode.

13. The welding power supply of claim 9, wherein at least one of said first setting portion and said second setting portion is a changeable visual display device.

14. The welding power supply of claim 13, wherein said changeable visual display device displays said color or said pattern corresponding to each of said first regions or each of said second regions, and wherein said color or said pattern corresponding to each of said first regions or each of said second regions is determined based on information stored in a computer.

15. The welding power supply of claim 13, wherein changeable visual display device is a liquid crystal display (LCD).

16. The welding power supply of claim 14, wherein said information corresponds to a setting of said first control portion or said second control portion.

17. The welding power supply of claim 9, wherein said color or said pattern in each of said first regions corresponds to a first characteristic of a welding electrode and said color or said pattern in each of said second regions corresponds to a second parameter of said welding electrode.

18. The welding power supply of claim 9, wherein said color or said pattern in each of said second regions is determined by a setting of said first control portion.

19. The welding power supply of claim 9, further comprising a welding input device and wherein said color or said pattern in each of said first regions is determined by a setting of said welding input device.

20. The welding power supply of claim 9, wherein said first output is one of welding voltage, welding current, and wire feed speed.

21. The welding power supply of claim 9, wherein said second output is one of welding voltage, welding current, and wire feed speed.

22. A welding system, said welding system comprising:
at least one welding electrode associated with a welding electrode carrying device; and
a welding power supply, said power supply comprising,
a control panel comprising,
a first output control to control a first output of said welding power supply, and
a second output control to control a second output of said welding power supply,
wherein said first output control comprises a first control portion which is positionable to control said first output and a first setting portion positioned adjacent to said first control portion,
wherein said first setting portion comprises a plurality of first regions which identify different settings to control said first output, and each of said first regions contains at least one of a different color and pattern,
wherein said color or pattern in each of said first regions corresponds to a first characteristic of said at least one welding electrode,
wherein said second output control comprises a second control portion which is positionable to control said second output of said welding power supply and a second setting portion positioned adjacent to said second control portion,
wherein said second setting portion comprises a second plurality of regions which identify different settings to control said second output, and each of said second regions contains at least one of a different color and pattern, and
wherein said color and pattern in each of said second plurality of regions corresponds to a second characteristic of a said at least one welding electrode.

23. The welding system of claim 22, said carrying device comprising a first identifier portion having a first pattern and a first color, wherein at least one of said first pattern and said first color identifies at least said first characteristic of said at least one welding electrode, and wherein at least one of said first pattern and said first color of said first identifier portion corresponds to at least one of said color or said pattern in said plurality of first regions.

24. The welding system of claim 22, said carrying device comprising a first identifier portion having a first pattern and a first color and a second identifier portion having a second pattern and a second color,
wherein at least one of said first pattern and said first color identifies at least said first characteristic of said at least one welding electrode,
wherein at least one of said second pattern and said second color identifies at least said second characteristic of said at least one welding electrode, and
wherein at least one of said first pattern and said first color of said first identifier portion corresponds to at least one of said color or said pattern in said plurality of first regions and at least one of said second pattern and said second color of said second identifier portion corresponds to at least one of said color or said pattern in said plurality of second regions.

25. The welding system of claim 22, further comprising a welding input device and wherein said color or said pattern in each of said first regions is determined by a setting of said welding input device.

26. The welding system of claim 22, wherein said carrying device is a spool.

27. The welding system of claim 22, wherein said color or said pattern in each of said second regions is determined by a setting of said first control portion.

* * * * *